US007336659B2

(12) United States Patent
Meago

(10) Patent No.: US 7,336,659 B2
(45) Date of Patent: Feb. 26, 2008

(54) METHOD FOR TRANSMITTING MULTIMEDIA SERVICES IN THE UMTS NETWORKS BY IMMEDIATE MULTICASTING OF A STREAMING SUBSET

(75) Inventor: Francesco Meago, Sondrio (IT)

(73) Assignee: Siemens Mobile Communications S.p.A., Milan (IT)

( * ) Notice: Subject to any disclaimer, the term of this patent is extended or adjusted under 35 U.S.C. 154(b) by 798 days.

(21) Appl. No.: 10/806,115

(22) Filed: Mar. 23, 2004

(65) Prior Publication Data

US 2004/0223513 A1 Nov. 11, 2004

(30) Foreign Application Priority Data

May 9, 2003 (EP) .................................. 03425297

(51) Int. Cl.
*H04L 12/28* (2006.01)
*H04J 3/16* (2006.01)
(52) U.S. Cl. ........................ 370/390; 370/432; 370/465
(58) Field of Classification Search .................... None
See application file for complete search history.

(56) References Cited

U.S. PATENT DOCUMENTS 6,041,359 A 3/2000 Birdwell (Continued)

OTHER PUBLICATIONS

Fenger, Carl et al.; "The Fantastic Broadband Multimedia System;" XP002258083; May 31, 2000; retrieved from Internet on Oct. 16, 2003: <URL: http://www.broadcastpapers.com/date/The%20Fantastic%20Broadband%20Multimedia%20Distribution%20System.pdf>.

(Continued)

*Primary Examiner*—Andrew C. Lee
(74) *Attorney, Agent, or Firm*—Birch, Stewart, Kolasch & Birch, LLP

(57) ABSTRACT

The method concerns multicast service delivering through the UMTS and GSM networks. For this aim is given higher priority to an opportune subset of all the real-time services with guaranteed bandwidth transmissible by the network. This subset is named IS-MBMS (Immediate Streaming-Multimedia Broadcast Multicast Service). A certain amount of physical resources is reserved in all the system for the IS-MBMS services; not real-time services can be transmitted on the reserved resources when not used by the IS-MBMS ones. The reserved resources allow for transmitting the IS-MBMS services with minimum bit-rate, at least. The network announces in the service area that an IS-MBMS content becomes available; in reply one or more subscribed users transmit a request for joining a multicast group for that service. The network transmits a notification message on a multicast channel to give to the joined users useful information of how get the announced service, i.e.: Service-Id, RB parameters, etc. The IS-MBMS content is transmitted immediately on a point-to-multipoint channel set-up in each involved cells, even if there are zero recipients in the cell. Content is transmitted in parallel in different cells, leading to service continuity, and the mobile station can perform soft combining. During the IS-MBMS content delivery the network can count in each involved cell the number of subscribed users joined to the transmitted IS-MBMS service. The network switches from point-to-multipoint to point-to-point or to no transmission depending on the result of counting and on a fixed threshold. Alternatively the network, parallel to the content delivery, can execute a checking procedure to see if there are joined users in a cell: in this case the point-to-multipoint channel is switched to no transmission (FIG. 3).

11 Claims, 3 Drawing Sheets

TIMELINE OF THE IS-MBMS CONTENT DELIVERY

U.S. PATENT DOCUMENTS

2003/0108015 A1*  6/2003  Li .............................. 370/338
2004/0156354 A1*  8/2004  Wang et al. ................. 370/352
2005/0130701 A1*  6/2005  Zendle ....................... 455/555

OTHER PUBLICATIONS

3GPP; Technical Specification Group Services and System Aspects; "Multimedia Broadcast/Multicast Service; Architectureand Functional Description" XP002258084 ; Sep. 2002; retrieved from Internet on Oct. 9, 2003: <URL: http://www.3gpp.org/ftp/tsg_sa/TSG_SA/TSGS_17/Docs/PDF/SP-020535.pdf>.

Lorang, Martin et al. ; "Experiments on Integrated Traffic Control for ATM in the ACTS Project EXPERT;"Proceedings of the European Conference on Networks and Optical Communications (NOC '97): Core and ATM Networks, Antwerp 1997, XP002258085; retrieved from the Internet on Oct. 10, 2003: <URL: http://www.ind.uni-stuttgart.de/Content/Publications/View/Frame/Keyword.html?TRAFFIC_CONTROL>.

Borella, Andrea et al. ; "Implementation schemes for multicast bandwidth brokers in multidomain networks;" Computer Networks, Elsevier Science Publishers B.V., Amsterdam, NL, vol. 37, No. 5, Nov. 22, 2001; pp. 519-540.

3GPP; Technical Specification Group Radio Access Network; "Multimedia Broadcast Multicast Service (MBMS); UTRAN/GERAN Requirements;" Sep. 2003.

3GPP; Technical Specification Group Services and System Aspects; "Quality of Service (QoS) concept and architecture;" Dec. 2003.

3GPP; Technical Specification Group Services and System Aspects; "Multimedia Broadcast/Multicast Service; Stage 1;" Jan. 2004.

3GPP; Technical Specification Group Radio Access Network; Introduction of the Multimedia Broadcast Multicast Service (MBMS) in the Radio Access Network (Stage-2); Feb. 2004.

3GPP; Technical Specification Group-RAN3 Meeting #35; "MBMS Service Scenarios;" Tdoc R3-030464; Seoul, Korea, Apr. 7-11, 2003.

* cited by examiner ly take place simultaneously in every cell in order to
METHOD FOR TRANSMITTING MULTIMEDIA SERVICES IN THE UMTS NETWORKS BY IMMEDIATE MULTICASTING OF A STREAMING SUBSET This Nonprovisional application claims priority under 35 U.S.C. § 119(a) on Patent Application No(s). 03425297.3 filed in Europe on May 9, 2003, the entire contents of which are hereby incorporated by reference.

FIELD OF THE INVENTION

The present invention relates to the field of service delivering through the UMTS (Universal Mobile Telecommunication System) networks, and more precisely to a method for transmitting multimedia services in the UMTS networks by immediate multicasting of a streaming subset.

BACKGROUND ART

The following 3GPP (3rd Generation Partnership Project) document shall be considered as relevant background art in the field of the invention:

[1] TS 22.146: "Multimedia Broadcast/Multicast Service; Stage 1".
[2] TS 25.346 (Release 6): "Introduction of the Multimedia Broadcast Multicast Service (MBMS) in the Radio Access Network".
[3] TR 23.846: "Multimedia Broadcast Multicast Service; Architecture and Functional Description".
[4] TR 25.992: "Multimedia Broadcast Multicast Service (MBMS); UTRAN/GERAN Requirements".
[5] R3-030464: "MBMS Service Scenarios"; 3GPP TSG-RAN3 Meeting #35. Seoul, Korea, 7-11Apr. 2003.

According to the MBMS protocols and channels described in these documents, the MBMS paradigm is based on the possibility to carry valuable content on multicast/broadcast radio channels in order to serve multiple users at the same time with the same data flow, therefore minimising the radio and network resources consumption. By means of the MBMS technique service contents are transferred in the downlink direction only: from the network to the UE (User Equipment).

Different UMTS Quality of Service (QoS) classes are defined in 3GPP document TS 23.107, namely: Conversational, Streaming, Interactive and Background. The only classes that are applicable to the MBMS transmissions are Streaming and Background, because they imply data transfer in the downlink direction only. Streaming and Background are very different traffic classes, and they imply very different kinds of transports. Streaming class is part of the Real Time (RT) services with guaranteed bandwidth, e.g.: audio-video streaming, where low transfer delay is not a very stringent requirement and buffering can occur in the UE. Background class is part of the Not Real Time (NRT) services and is delay insensitive, e.g.: file download, with the lowest priority and no guaranteed bandwidth.

MBMS service can be transmitted either through a ptp (point to point) channel or through a ptm (point to multipoint) channel. One channel for each user is engaged with ptp, while one channel for all the users in the cell is engaged for ptm. Non-tracking and tracking/counting areas are distinguished in standardisation. Non-tracking are high-concentration areas (e.g. stadiums) where the transmissions will be only ptm by configuration. In tracking/counting areas the MBMS users are tracked and/or counted before transmission, in order to know how many they are in each cell for a given service. Counting of the active users in tracking/counting areas allows to decide whether it's better to setup a ptm channel, a number of ptp channels or no channels. A switching threshold between ptp and ptm is established for this purpose, this might be around 8 users.

OUTLINED TECHNICAL PROBLEM

It must be noted that MBMS data transfer should generally take place simultaneously in every cell in order to support UE mobility, but this requires the availability of resources in every cell for this purpose. Reserving resources in every cell for MBMS is in contrast with the basic concept of Background traffic class, as the Background traffic class has no guaranteed resources. Reserving resources in every cell for MBMS is a bit in contrast also with the basic idea of Streaming traffic class, as in usual Streaming traffic class the guaranteed bandwidth is limited to one or a few cells (dedicated services), but it does not cover all the service area. Currently there is some confusion on how Streaming and Background MBMS services will be transported, and the relevant standardisation is not completed yet. In particular, in order to support MBMS Streaming services, it is not clear whether the operator will be willing to turn down other RT users in order to free-up enough resource for MBMS in all the involved cells of the service area, or the operator will start reserving resources in all the cells at the time the service content is available and wait for the resource to become available in all the involved cells. In case the resource is not currently available in some cells (and in case it cannot be freed-up by other means like service downgrading) the system will wait for enough time so that enough RT users have finished with their receptions. We will refer to this time as "the waiting time". As MBMS transmission has to take place simultaneously in the different cells, the waiting time for the MBMS Service is the longest among the waiting times of the different cells: the one needed in the worst-case cell of the whole service area. Although the two possibilities above (free-up/waiting time) are applicable to both cases of tracking/non-tracking areas (in particular, it applies to the case of tracking/counting area, and to the case where the service area is composed by a mix of tracking/counting areas and non-tracking areas), none of the two seems us to be good enough for all possible kinds of MBMS services. In the free-up case we may need to turn down RT users with ongoing sessions, generating user's dissatisfaction. In the waiting time case, we have to wait an unpredictable time before transmission. Of course a compromise among waiting time and need for turning down other RT users would also be possible, leading to some user's dissatisfaction for the RT users that are turned down, and e.g. some minutes delay for the waiting time.

Furthermore, counting (and/or re-counting) is a procedure involving time and resource consumption in all the service area, so that service content delivery is slowed down consequently (in case counting is performed just before transmission, i.e. when the content becomes available) or significant resource consumption takes place (in case the operator wants to have a preventive knowledge on what the best transmission method would be at any time even before service transmission when service content is not yet available, implying counting/re-counting at any time). Counting is expressly mentioned in the cited documents, as being requested in the notification message transmitted before the transmission of specific MBMS service data. The latest requests that emerged from an MBMS service provider (see Ref. [5]) suggest the counting phase mandatory before the first data transfer for MBMS Multicast Mode. In this case the content delivery is unavoidably delayed.

OBJECT OF THE INVENTION

The main object of the present invention is that to overcome the drawbacks of the prior art in delivering MBMS Streaming services through a mobile radio network, either of the second or third generation indifferently, and indicate a smarter transmission technique than the ones identified up to now in standardisation. Positive results might be highly appreciated by the operators.

SUMMARY OF THE INVENTION

Said objects are achieved by means of the claimed method for transmitting multimedia services through a mobile radio network. The transmission strategy of the invention is addressed to a subset of MBMS real-time services, such as the streaming QoS class, for which the operator would benefit from immediate content delivery. The immediate multicasting of said subset of real-time services is termed "IS-MBMS" (Immediate Streaming-MBMS) from now onwards. Possible services are, for example: Breaking News; Stock Exchange quotations; a new made goal in soccer; etc.

In accordance with the IS-MBMS strategy, a certain amount of resources is reserved for the IS-MBMS service on the whole Service Area for a "period of interest", in a way that other RT services cannot access those resources. The reserved capacity needs to at least allow for transmission of the IS-MBMS with minimum QoS (minimum bit-rate). The period of interest is the time during which the service could potentially be transmitted for IS-MBMS services. The period of interest could be either static (for example the whole day) or dynamic (in case the scheduling and characteristics of IS-MBMS programs is known), and the amount of reserved resource could vary over time. An MBMS program is to be intended as the MBMS service plan: definition of service availability times and expected characteristics of content, content delivery or data rates over time. The dimensions of the IS-MBMS Service Area is an operator choice: for example, the operator might decide not to include rural areas.

Resources that are reserved for IS-MBMS services are anyway available for NRT services when not used by IS-MBMS. This relieves the effects of an unnecessary reservation of the resources otherwise usable by other services. As an example, the IS-MBMS reserved capacity could be around 10% of the total cell capacity. (this should allow at least for a 16 kbps MBMS service). This capacity would in fact be usable by IS-MBMS, or by NRT services with lower priority and the possibility of preemption by incoming IS-MBMS services. Immediate Streaming point-to-multipoint transmission could lead to an unnecessary use of the resource for a short period (maybe up to 20 seconds). This is not so bad if compared to the known cases where the resources have to be reserved anyway for maybe minutes, due to the iterative process of counting and the waiting time.

In conformity with the IS-MBMS transmission strategy carried out by the method of the present invention, a point-to-multipoint (ptm) transmission is set up immediately after availability of the service content that is notified to the MBMS subscribers by a "notification" message. Optionally, during the period following the start of a new MBMS service session a checking/counting of the users might take place to see if there are MBMS users in the cell, and to see if other transmission techniques would be better. The minimal MBMS feature could not even implement the counting but only the checking to verify whether there is at least one MBMS user, and therefore not implement the ptm/ptp switching but only the ptm/-, where "-" stands for "no transmission". As in the known art a certain amount of resources is not reserved on the whole Service Area for a subset of Streaming services, a fast delivery of the RT services is prevented up to now. The immediate content delivery achieved by the present invention neutralizes the delay on the content delivery due to the counting procedure, at least for the IS-MBMS subset. Checking/counting may be anyway performed during the content delivery for deciding the best transmission strategy.

Transmissions can go on in parallel in different cells, leading to service continuity. It could eventually take advantage from autonomous soft combining (macrodiversity combining in the UE of different identical data transmitted from different cells). The MBMS Streaming services will normally not support HSDPA (High Speed Downlink Packet Access) technique, because the high rates of HSDPA are not normally guaranteed for Streaming services, besides also the ptp/ptm switching threshold depends on HSDPA capabilities of the UE. In the end, the switching point among ptp and ptm is likely to be around 2 users for MBMS Streaming, so that setting up ptm is normally a good guess for MBMS Streaming. This could be specially true for $3^{rd}$ generation operators that are likely willing to deploy MBMS before HSDPA.

ADVANTAGES OF THE INVENTION

The method of the present invention allows to separate and promptly deliver the content of a selected subset of RT services from the other MBMS ones by relying on reserved resources instead of waiting minutes. User satisfaction is achieved in this way and also the operator will have image return. For example, considering two users with different operators, where the first user receives the IS-MBMS services (new made goal) one minute earlier than the other connected to a conventional MBMS operator, obviously the first is better. The service providers could be willing to have the IS-MBMS service and recognise it as an important feature.

BRIEF DESCRIPTION OF THE DRAWINGS

The features of the present invention which are considered to be novel are set forth with particularity in the appended claims. The invention, together with further objects and advantages thereof, may be understood with reference to the following detailed description of an embodiment thereof taken in conjunction with the accompanying drawings given for purely non-limiting explanatory purposes and wherein:

DETAILED DESCRIPTION OF A PREFERRED EMBODIMENT OF THE INVENTION

Figure 1:
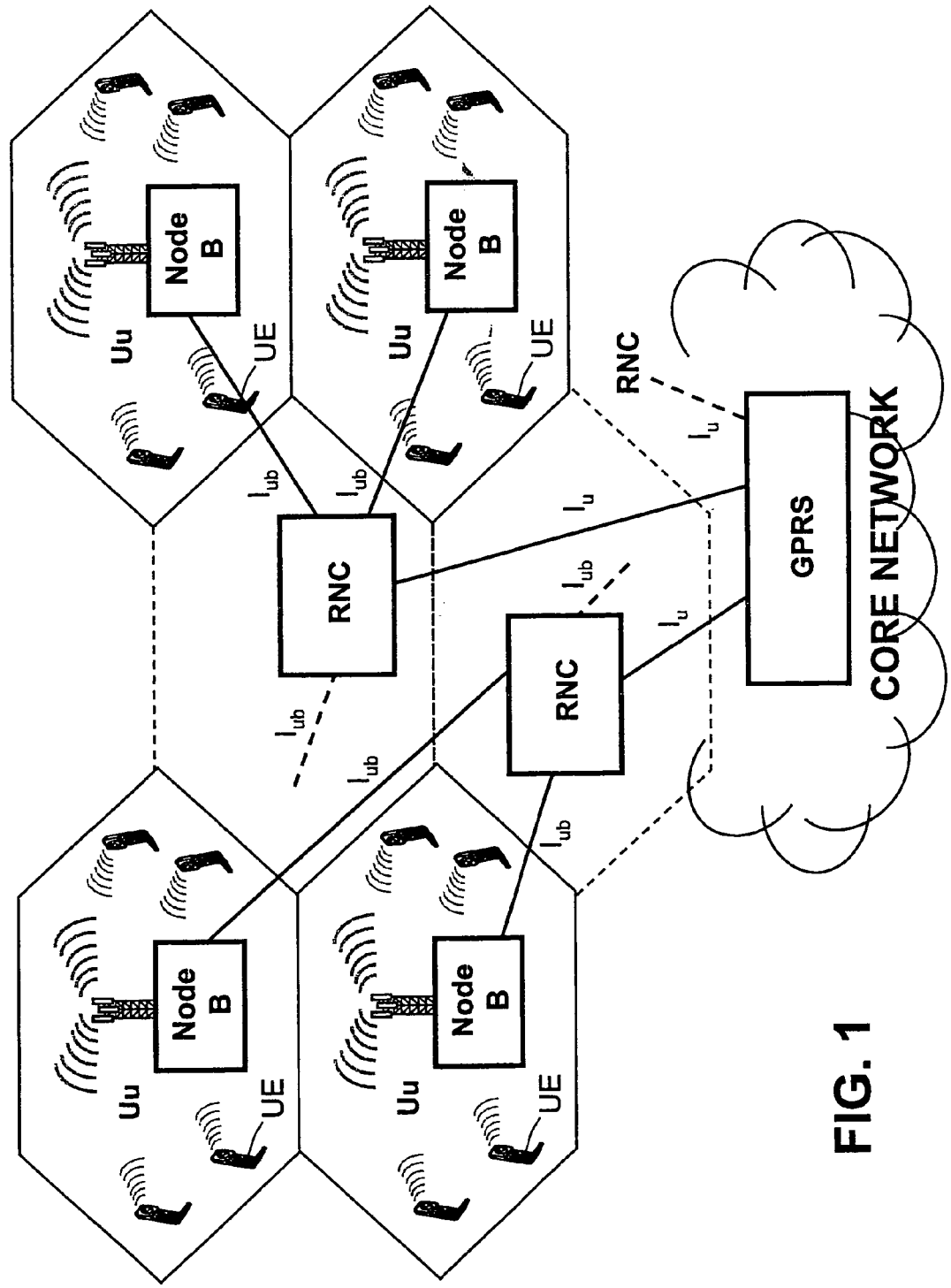
FIG. 1 shows a partial UMTS network corresponding to a possible MBMS service area.

With reference to FIG. 1 we see a partial UMTS network constituted by a core network CN and a territory subdivided in service cells. The core network CN includes a block SGSN (Serving GPRS Support Node) physically connected to several blocks RNC (Radio Network Controller), each of them physically connected to a pool of controlled blocks named "Node B" that correspond to fixed Base Stations inside respective cells. Each Node B is connected via radio with a plurality of mobile stations, also termed User Equipment (UE). The following interfaces are defined: an Iu interface between the SGSN and the RNCs; an Iub interface between the RNC and the Node Bs; and an on-air Uu interface between the Node B and the User Equipment UE.

The UMTS network is subdivided into contiguous service areas, each including several cells, the mobile terminal in idle state is traceable into by paging messages. The needed bearers for conveying the MBMS service contents downlink, with particular care to the IS-MBMS ones, are allocated at the various interfaces. 3GPP group in the ambit of the ITU-T (International Telecommunication Union) has issued a complete set of Technical Specifications (TS) for the standardisation of the UMTS network. The UMTS network shares the existing GSM (Global System for Mobile communications) Core Network with the GPRS (General Packet Radio Service) addendum.

Figure 2:
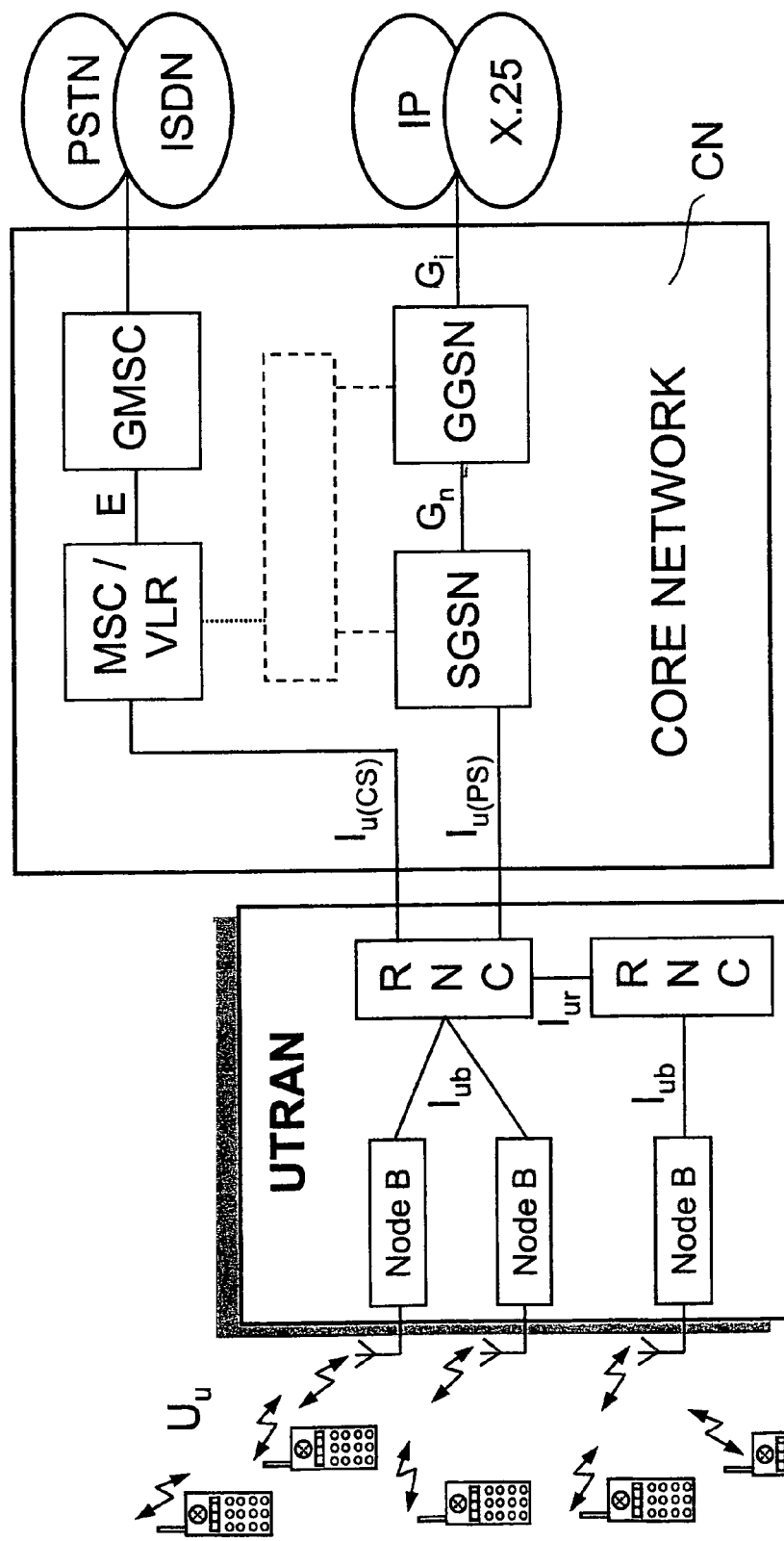
FIG. 2 shows a general block diagram of the UMTS system.

FIG. 2 shows with greater detail the UMTS system of FIG. 1. With reference to FIG. 2 the Core Network CN is connected to an UTRAN (Universal Terrestrial Radio Access Network) access network. For the sake of simplicity a GERAN (GSM/EDGE Radio Access Network, where EDGE means Enhanced Data rates for GSM Evolution), access network, also connected to the core network CN, is not represented. Without limitation, the method of the invention is also applicable to the Circuit Switched services. The UMTS system of FIG. 2 is described in the TS 23.002 (CN) and TS 25.401 (UTRAN). The UTRAN access network includes a plurality of Node B blocks and the respective RNC controllers, so as the Iub and Uu interfaces. Node B includes a Base Transceiver Station (BTS). A mobile station UE, includes a Mobile Equipment ME with a respective USIM card (UMTS Subscriber Identity Module). Without limitation, an UE can be either of the single or multistandard type. The upper RNC is a SRNC (Serving RNC) connected to the Core Network CN by means of a first Iu (CS) Circuits Switched (CS) interface and a second Iu (PS) Packet Switched (PS) interface. The RNC placed below is a DRNC (Drift RNC) connected to the upper RNC by means of an internal Iur interface. Each RNC controlling cells is named CRNC and is interfaced to the other type of RNCs through the Iur interface. The UTRAN with the served UEs constitute a Radio Network Subsystem (RNS) disclosed in TS 23.110. The core network CN includes the following Network Elements: MSC/VLR (Visitor Location Register), GMSC (Gateway MSC), SGSN (Serving GPRS Support Node), and GGSN (Gateway GPRS Support Node). For the sake of simplicity other Network Elements known by the 3GPP specifications are not indicated but generically represented with a dashed rectangle. The following interfaces are visible inside the CN block: E, Gn, and Gi. The upper RNC is interfaced to the MSC/VLR block through the Iu (CS) interface and to the SGSN node through the Iu (PS) interface. The GMSC block is interfaced at one side to the MSC/VLR block, through the E interface, and at the other side to a PSTN (Public Switched Telephone Network) and to an ISDN (Integrated Services Digital Network) networks. The GGSN node is interfaced at one side to the SGSN node, through the Gn interface, and at the other side to an IP (Internet Protocol) network, through the Gi interface, and also to a public packet switching network of the X.25 type.

In operation, the VLR keeps records of the individual location of the mobiles during their wandering on the coverage area; the MSC performs: access control, safety, routeing, promotes external handovers and other supervising functions related to the calls. The SGSN node with the help of MSC performs similar operations for the packets, except handover but with cell-reselection, and provides for the MBMS content delivery. Inside the UTRAN access network the SRNC has many different tasks in the RNS, for example, is responsible for the Radio Resource Management and the Operation and Maintenance (O&M functionality) of itself and the connected Node Bs. As known, the UMTS General Protocol Architecture includes Non-Access Stratum (NAS) protocols, e.g.: CM, MM, GMM, SM, SMS, and Access Stratum (AS) protocols, e.g.: Radio protocols (TS 25.2xx, 25.3xx), Iu protocols (TS 25.41x), and Iur/iub protocols (TS 25.42x/25.43x). The Radio protocols and Iu protocols communicate with the upper NAS. The higher layer NAS protocols handle control aspects, e.g.: Mobility Management (MM), Connection Management (CM), Session Management (SM), and Short Message Service (SMS). The Radio protocols and Iu protocols of the AS stratum are used to exchange user data and control information between the Core Network CN and the UEs. According to 3GPP TS 25.401, the protocol structures of the Iu, Iur, and Iub UTRAN interfaces are designed in horizontal layers and intersecting vertical planes, logically independent of each other. There are two main horizontal layers: the Radio Network Layer, and the Transport Network Layer; and three vertical planes: the Control Plane, the User Plane, and the Transport Network Control Plane. All UTRAN related issues are placed in the Radio Network Layer only. The Transport Network Layer is used for offering transport technologies without any UTRAN specific requirements. The Control Plane is used for all UMTS-specific control signalling. It includes the Application Protocols, i.e. RANAP (Radio Access Network Application Part), RNSAP (Radio Network Subsystem Application Part), NBAP (Node B Application Part) and the signalling bearer for transporting the Application Protocol messages. The User Plane is used to transport all user data, e.g. MBMS data, and includes the data streams and the data bearers for the data streams. Each data stream is characterised by one or more frame protocols specified for those interfaces. The Transport Network Control Plane is used for all control signalling within the Transport Layer. It contains no Radio Network Layer information and its central aspect is the ALCAP (Access Link Control Application Part) used for set up data bearer for the User Plane, as described in TS 25.410, 430, and 430. According to 3GPP TS 25.301, the Radio Interface Protocols are used for the transfer of user and control data between the UE and UTRAN. The protocol architecture consists of two vertical planes: the Control Plane and the User Plane intersecting three horizontal layers: L1, L2, and L3. The Control Plane is used for all UMTS-specific control signalling. The User Plane is used to transport all user data, e.g. MBMS data. The lowest Layer 1 (L1) is the PHY (Physical Layer). Layer 2 is subdivided into the following sublayers: MAC (Medium Access Control), RLC (Radio Link Control), PDCP (Packet Data Convergence Protocol), and BMC (Broadcast/Multicast Control). MAC and RLC are used both for the User Plane and Control Plane. PDCP and BMC are only defined for the User Plane. Only the RRC (Radio Resource Control) protocol is defined for Layer 3. The RRC is interfaced to the L1 and L2 protocols to provide local interlayer services and configuration control. The higher layer NAS signalling, such as: MM, CM, SM, and SMS are transparently transmitted between UE and CN, therefore they are not in the scope of the Radii Interface Protocols.

With particular reference to TS 25.346, a multicast functionality entitled "MAC m" is added in the MAC (Medium Access Control) layer of the UMTS system of FIG. 2 for introducing MBMS related transport channels. Two logical channels are considered for MBMS: MCCH (MBMS Control Channel) and MTCH (MBMS Traffic Channel). MCCH logical channel is defined as a ptm downlink channel for transfer of control plane information between network and UEs in RRC (Radio Resource Control) either in Idle or Connected Mode. The control plane information on this channel is MBMS specific and is sent in a cell to UEs with an activated (joined) MBMS service. The MTCH logical channel is defined as a ptm downlink for transfer of user plane information between network and UEs in either RRC Connected or Idle Mode. The user plane information on this channel is MBMS specific and is sent in a cell to UEs with an activated MBMS service. The user plane protocol termination for the MTCH channel includes a first CRNC protocol stack transmitting towards a second stack placed at the UE side. The two stacks include (top-down): PDCP, RLC, and MAC. The stack at the UE side further includes a lower layer PHY for terminating the transmissions from Node B. The MBMS functionalities are required to be included in PDCP.

Considering the MBMS receptions for different RRC States/Modes, the BCCH (Broadcast Control Channel) contains information regarding the MCCH, while the latter contains information on the MTCH. In idle mode reception, the UE shall:
  if the UE supports MBMS and:
  if the UE has activated an MBMS service and this service is available in the cell where the UE is situated (i.e. MTCH and MCCH are available),
    act on RRC messages received on MCCH and:
    if the MBMS service requires the establishment of an RRC Connection, inform upper layers that the MBMS Service requires the establishment of an RRC Connection,
    if the MBMS service does not require the establishment of an RRC Connection,
      listen to the common transport channel on which the MTCH is mapped.

The RRC connected mode for MBMS reception is defined for the following states: URA_PCH (User Registration Area_Paging Channel), CELL_PCH, CELL_FACH (Forward Access Channel), and CELL_DCH (Dedicated Channel).

Several signalling flows are needed to be provided for the MBMS functionality, e.g. between: CN and CRNC; CRNC and SRNC; CRNC and UE; SRNC and UE. Signalling flows, and the involved bearers, convey MBMS information through the: Iu, Iur, Iub, and Uu interfaces of the UMTS network of FIG. 2. As far as service contents are concerned, for each MBMS service, data is transferred via an MBMS RAB (Radio Access Bearer) between the UE and the SGSN. For each MBMS service, data is transferred via one MBMS Iu bearer between RNC and the SGSN in the whole service area. Each CRNC within an MBMS service area will maintain an MBMS context, namely a list of connected mode UEs which are present in each cell of the CRNC and which have activated an MBMS service (the one indicated by its Service-ID). Each CRNC MBMS context is associated with an MBMS Service-ID. The list will include at least the U-RNTI (User Radio Network Temporary Identity) of the UEs. In the known specifications, the CRNC MBMS context is established when the MBMS Iu bearer is established between the RNC and the SGSN for a specific MBMS service (not per UE individually). Concerning signalling flows for MBMS, the following procedures are foreseen:

Service Context Establishment. A signalling flow is provided between CN and CRNC for handling MBMS to UEs either in Idle or Connected mode. The signalling flow is typically initiated when an MBMS service is created. The Multicast/Broadcast Service Area Information could include a service area where UEs have to be tracked (counted), and/or a service area where this is not required.

Channel type switching from ptm to ptp over Uu interface. Between SRNC and UE a RRC connection and Radio Bearers to specific UE are set up by the SRNC. The CRNC element is responsible for the decision regarding having ptm transmission or no ptm transmission in a cell for a specific MBMS service, a tracking/counting procedure can be enabled for this purpose. The CRNC informs all the SRNCs having UEs in that cell about its decision.

The signalling flows of the following procedures are only applicable for handling MBMS to UEs in Connected mode.

MBMS Attach over Iur. The purpose of this signalling flow is to allow the CRNC to add a new UE to the total number of UEs in a given cell using a MBMS service. The signalling flow is initiated when an UE with an ongoing MBMS service enters in a new cell controlled by the CRNC.

MBMS Detach over Iur. The purpose of this signalling flow is to allow the CRNC to decrease the total number of UEs receiving an MBMS service in a given cell. The signalling flow is initiated when a UE with an ongoing MBMS service leaves a cell controlled by the CRNC.

MBMS ptm Transmission Initiation over Iur. The purpose of this signalling flow is that the CRNC informs the SRNC when a MBMS Service is delivered over a common transport channel in a cell under the CRNC for a UE connected to the SRNC.

MBMS ptm Transmission Termination over Iur. The purpose of this signalling flow is that the CRNC informs the SRNC when a MBMS Service is no longer delivered over a common transport channel in a cell under the CRNC for a UE connected to the SRNC.

The following definitions taken from 3GPP TR 25.992 help the comprehension of the next description. The MBMS term used in the definitions shall be intended as comprehensive of a subset including the Immediate Streaming MBMS (IS-MBMS) services of the present invention.

Broadcast mode: The part of MBMS that supports broadcast services.

Counting: This is the function that UTRAN performs when it wishes to identify the number of multicast subscribers (all joined subscribers, or just above a "threshold") in a particular cell, that wish to receive a multicast session for a particular service.

MBMS (Broadcast/Multicast) Session: A continuous and time-bounded reception of a broadcast/multicast service by the UE. A single broadcast/multicast service can only have one broadcast/multicast session at any time. A broadcast/multicast service may consist of multiple successive broadcast/multicast sessions.

Multicast mode: The part of MBMS that supports multicast services.

MBMS broadcast activation: The process which enables the data reception of a specific broadcast mode MBMS on a UE. Thereby the user enables the reception locally on the UE.

MBMS multicast activation (Joining): The explicit point-to-point UE to network signalling, which enables a UE to become a member of a multicast group and thus start receiving data from a specific MBMS multicast service (when data becomes available).

MBMS Notification: The mechanism, which informs the UEs about the availability or coming availability of a specific MBMS RAB service content in one given cell.

Service Announcements/Discovery: The mechanisms should allow users to request or be informed about the range of MBMS services available. Operators/service providers may consider several service discovery mechanisms. This could include standard mechanisms such as SMS, or depending on the capability of the terminal, applications that encourage user interrogation.

Tracking: This is a function that allows UTRAN to follow the mobility of multicast subscribers. Inherently it can be used as a means of counting multicast subscribers.

Figure 3:
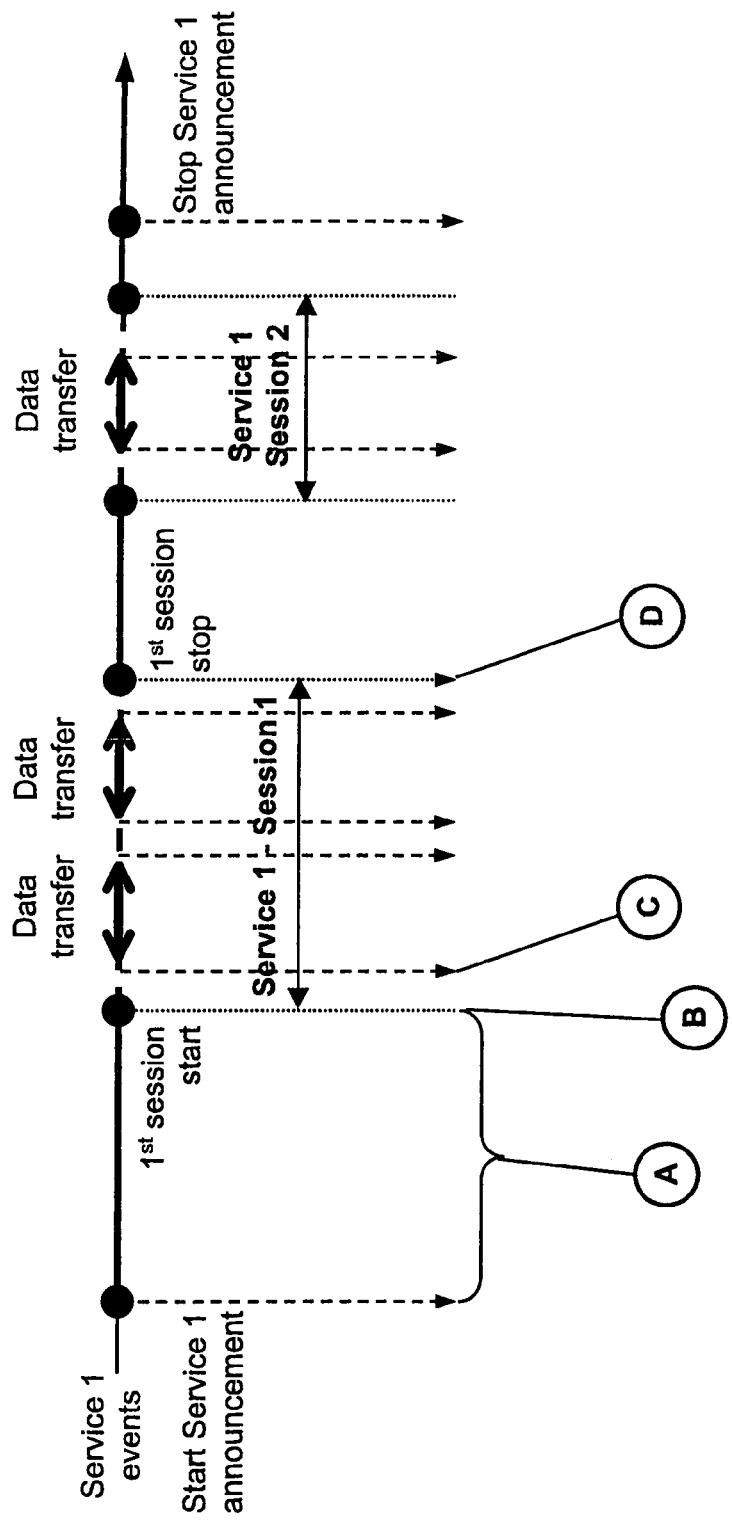
FIG. 3 shows a timeline of the IS-MBMS content delivering procedure of the present invention.

FIG. 3 shows a timeline of the IS-MBMS content delivering in accordance with the method of the present invention. Examples of possible IS-MBMS services are given in the introduction. With reference to FIG. 3, we see that the chain of the events starts in a point of the timeline named "Start Service 1 announcement" and terminates in a point named "Stop Service 1 announcement". Between these two points other significant time points are sequentially indicated. At the begin of the timeline a first session starts for Service 1. After the session is started, some MBMS Data transfer phases are sequentially performed until Session 1 is terminated for Service 1. After a certain delay a Session 2 is started for Service 1 and the Data transfer phases are repeated until Session 2 is terminated. The same happens for all the possible Sessions of Service 1. After a certain delay from the last Session is stopped, the depicted timeline reaches the stop Service 1 announcement. In the bottom part of FIG. 3 main time points and intervals are indicated with capital letters, as in the following:

letter A indicates the interval between the Start Service 1 announcement and the first session start;

letter B indicates the starting-point of the Session 1 for Service 1;

letter C indicates the starting-point of the first Data transfer;

letter D indicates the first session stop.

The time between start and stop of Service announcements is called "service availability". During the service availability time, a "period of interest" is identified as the time during which data could potentially be transmitted for IS-MBMS. This period could be static (even the whole day) or dynamic, in case the scheduling of IS-MBMS programs is known. In each cell of the service area an amount of resources is reserved for IS-MBMS for the period of interest, the amount depending on the scheduling of IS-MBMS programs and cell resource status. An MBMS program is the MBMS service plan defining service availability times and expected characteristics of content, content delivery or data rates over time. UMTS physical resources are constituted by different combinations of frequency, timeslot, and spreading code. The reserved capacity needs to at least allow for transmission of the IS-MBMS with minimum QoS (minimum bitrate). IS-MBMS reserved resources can not be used to allocate new other RT services, but can be used for transmitting other NRT services when not used by IS-MBMS. Nevertheless, IS-MBMS will have highest priority and preemption capability on the usage of this resource. This would still guarantee the precedence of the RT services other than IS-MBMS in nearly all the remaining resources.

During time interval A the users in the MBMS Service Area listen to the announcement for the opportunity to get Service 1, which belongs to the IS-MBMS subset. The IS-MBMS Service Area dimension is an operator choice: for example, the operator might decide not to include rural areas. Consequently to the announcement, a number of IS-MBMS subscribed users may enter in connected mode to join a group of users addressee of the service. The affected RNC will establish an MBMS Iu signalling connection and will create the MBMS context in the RNC. Besides, the network might start to keep trace of the joined users, for example, by holding fictitious connections in the cells (tracking). Otherwise these users should return in idle mode and the network wouldn't know their positions anymore (in idle mode the position of the UE is known only in the routing area which includes many cells). Fictitious connections don't involve active sessions and the engaged resources are minimal but could be engaged for a long time and could imply usage of unneeded signalling. In accordance with a procedure named RAB linking, the network maintains the MBMS requesters in connected mode for knowing how many they are and take future decisions on the best strategy to deliver the service. Users held in connected mode (apart from URA_PCH) ask for cell update when the cell is changed, but this is not always required for MBMS because in the incoming cell the number of users in connected mode could be large enough and the incoming user is suggested to return in idle mode. In this case when the idle user crosses the cell boundary its position is definitively lost by the network. Due to the uncertainty of the position of the users, RAB linking is not completely reliable to track the IS-MBMS (or MBMS) service requesters in the various cells and a counting, or recounting, is needed. Preventive counting before the start of the IS-MBMS service is an expensive operation in terms of time and resources, because a paging is needed and some precautions have to be taken for preventing the jam of the upstream channel due to possible simultaneous responses of the users. Another drawback of holding RAB linking active during the whole time interval A is that a lot of users have to be unnecessarily maintained in connected mode for a long time (the duration of time interval A could span even one day).

The position assumed by the method of the invention is that of leaving the IS-MBMS users go in idle mode after an IS-MBMS service is joined. RAB linking has to be considered as optional during time interval A. The IS-MBMS contexts per service, per cell, are created when the UEs join the service. Also the preventive counting is unnecessary or has to be considered as completely optional for the invention.

Before the first session start for Service 1 the network checks if there are enough reserved resources for delivering the service, as the resources could be occupied by one or more other IS-MBMS services that are running in parallel. If there are not enough resources, there is either the need to wait that the other services finish, or to try to reserve more resources for IS-MBMS depending on operator's decisions. At the session starting point B the network transmits on the Iu and Uu interfaces a notification message towards the subscribed users joined to Service 1 to inform them about the availability of the service content. Notification implies a paging on the Uu interface towards the joined UEs. The notification message includes the Service-Id and the Radio Bearer (RB) parameters that are needed to decode the transmitted data. At the completion of the paging procedure a multicast transmission for the Service 1 content starts immediately on a ptm channel at the time point C, even if there are "zero recipients" in the cell. Transmission can go on in parallel in different cells, leading to service continuity. It could eventually take advantage from autonomous soft combining (macrodiversity combining in the UE of different identical data transmitted from different cells). For the sake of completeness, at the session starting-point B a mechanism alternative to the RAB linking has been proposed to 3GPP by an MBMS service provider. The proposed mechanism is that the RNC node determines, based on local RRM strategies, the number of UEs that are needed to be held in connected mode, and relevant RRC connections are requested for these UEs. In accordance with the method of the invention, the UEs may be sent in connected mode during the whole service availability between the announcement of Start Service 1 and the end of either last Session or Stop Service 1 announcement. More precisely: prior to the first session, during the whole session, and between sessions. This may depend on the service duration, on the mobility of connected mode UEs, and other implementation specific criteria. For example, if the RNC receives the indication that the upcoming Session contains just one short video-clip, then a reasonable RNC implementation will not require to send UEs in connected mode as it is expected that the mobility of UEs will not change in this short time. However, if the session is expected to be "quite long" the RNC will start to send UEs into connected mode. So as for RAB linking, even the RRC connected mode is not indispensable before the first IS-MBMS transmission starts. Continuing and establishing of dedicated RRC connections is also optional as far as the IS-MBMS is concerned.

At time point C the IS-MBMS Radio Access Bearer is established, to say, resources are reserved inside the UTRAN both on the Iu and Uu (and Iub) interfaces for relevant transmission fluxes. At time point C the parameters for the Radio Bearer have been signalled to the users. At this point in time the first IS-MBMS Data transfer starts. Data transfers are repeated until the first session is stopped for Service 1. At time point D the UEs are notified on first session stop and the engaged resources are released for Service 1, continuing to be reserved for IS-MBMS. Passed a certain time a Session 2 starts for Service 1 again, and so on until the availability time of Service 1 expires. When this happens the message "Stop Service 1 announcement" is transmitted by the network. From this time onward the UEs cannot request Service 1 unless a new relevant announcement is received. Different MBMS services can go on in parallel (e.g. Service 1 and Service 2) and the respective timelines can overlap in time. NRT services can be allocated on the IS-MBMS reserved resources when the resource is not being occupied by IS-MBMS.

The network, during an IS-MBMS Data transfer session, can execute specific procedures (like checking, counting, re-counting or tracking) to optimise the downstream IS-MBMS resource usage.

The invention claimed is:

1. Method for transmitting services with different media components and quality of service from a core network (CN) of a cellular telephone system towards a plurality of mobile stations traceable into a service area, the system employing physical resources for conveying signalling and traffic at the various interfaces (Iu, Iur, Iub, Uu) between the core network and the mobile stations (UE), characterised in that includes the steps of:
  a) reserving an amount of physical resources on the whole service area for a period of interest to be used by the network for transmitting with higher priority services belonging to a selected subset of the whole transmissible real-time services with guaranteed bandwidth;
  b) transmitting, by the network, repeated announcements into the service area to inform the subscribed users about the availability of a service which belongs to the selected subset;
  c) transmitting by one or more subscribed users that are listening to the announcement a request to the network for joining a group of requesters for the announced service;
  d) transmitting, by the network, a notification message towards the joined users for giving useful information on how to receive the announced service;
  e) transmitting, by the network, the content of the announced service towards the joined users on a point-to-multipoint channel set-up in the cells of the service area.

2. The method of claim 1, characterised in that the bandwidth of the reserved resources allows to transmit the announced service with at least the minimum bit-rate.

3. The method of claim 1, characterised in that the reserved resources are usable by the network for transmitting non-real-time services with lower priority and non-guaranteed bandwidth when not used for transmitting service content of said subset.

4. The method of claim 1, characterised in that during a period of interest for the availability of service, ongoing services of said subset have precedence on other real-time services of the same subset that need to be transmitted.

5. The method of claim 1, characterised in that the point-to-multipoint transmission is started at step e) even if there are zero recipients in the cell for the announced service.

6. The method of claim 1, characterised in that the service content is transmitted in parallel in different cells and the mobile stations is free of combining identical data transmitted from different cells.

7. The method of claim 1, characterised in that the period of interest is fixed.

8. The method of claim 1, characterised in that the period of interest is scheduled dynamically based on a service planning.

9. The method of claim 1, characterised in that the amount of reserved resource in the different cells of the service area is varied over time according to service planning and cell resource status.

10. The method of claim 1, characterised in that the network during the service content delivery at step e), for each involved cell, carries out the steps of:
  counting the subscribed users joined to the service of the transmitted content;
  comparing the counting result with a fixed threshold previously set-up for discriminating between the suitability of transmitting on a channel either point-to-multipoint or point-to-point;
  switching towards the point-to-point channel if there are joined users but the counting result is lower than the threshold;
  terminating the transmission if there are no joined users.

11. The method of claim 1 except the preceding one, characterised in that the network parallel to the service content delivery at step e), for each involved cell, carries out the steps of:
  checking whether there are joined users;
  switching from the point-to-multipoint channel to no transmission in case of no joined users.

* * * * *